Patented Apr. 30, 1929.

1,711,048

UNITED STATES PATENT OFFICE.

JOSEPH EBERT, OF HILLSIDE, NEW JERSEY, ASSIGNOR OF THIRTY-EIGHT AND THIRTY-THREE ONE-HUNDREDTHS PER CENT TO WHITNEY PAYNE, OF WYNNE-WOOD, PENNSYLVANIA, AND THIRTY-EIGHT AND THIRTY-THREE ONE-HUN-DREDTHS PER CENT TO RANDALL ANDERSON, OF BRYN MAWR, PENNSYLVANIA.

YELLOW PHENOLPHTHALEIN AND PROCESS OF MAKING SAME.

No Drawing.   Application filed April 30, 1927.   Serial No. 188,058.

This invention relates to an improved yellow phenolphthalein and to a process of making the same and more particularly to an amorphous yellow phenolphthalein of high purity.

The phenolphthalein that has been heretofore on the market has been a white crystalline or amorphous substance having a melting point of not lower than 256° C., or an amorphous yellow powder. The latter product has been preferred by the manufacturers of certain laxatives because of its somewhat higher laxative action, but because of the impurities present in it this product does not meet certain tests described in the United States Pharmacopœia. Its melting point, for example, is around 235 to 252° C. and its ash content around 0.5 to 1.5%.

The present invention relates to an improved yellow phenolphthalein which is of relatively high purity as compared with ordinary yellow phenolphthalein and which also has decided advantages over the white crystalline or amorphous products of the U. S. P. as a laxative, its effectiveness being very appreciably greater than that of the U. S. P. product. I have found that such a superior product can be produced from the ordinary amorphous yellow phenolphthalein by removing impurities therefrom such as condensation products or by-products commonly present in yellow phenolphthalein and which are responsible for the low melting point, the wide melting range and the high ash content of the product. I have found that such impurities can be readily removed by an extraction process which does not affect the amorphous character of the product and which leaves a purified amorphous yellow phenolphthalein with a melting point not lower than 256° C. and an ash content not greater than 0.05%, and contains more than 99% actual phenolphthalein. I have found that such purification which is of a selective and partial character can readily be effected by extraction methods, such as hereinafter more fully described.

The following specific example will further illustrate the improved process of the invention and the production of the improved product of the invention.

Crude phenolphthalein is produced in the ordinary way by the condensation of phenol and phthalic anhydride. The crude phenolphthalein, after being freed from the excess of phenol and phthalic anhydride is dissolved in a dilute caustic soda solution containing about 10% caustic soda, using for example 250 kilos of a dilute caustic soda solution for 100 kilos of the crude phenolphthalein. The resulting solution is mixed with 600 kilos of a dilute solution of a mineral acid, for example, a solution containing 4% hydrochloric acid, which serves to throw the phenolphthalein out of solution. The resulting product is removed by filtration, washed and dried.

100 kilos of the product thus produced are mixed with 100 liters of a suitable solvent, such as amyl alcohol or butyl alcohol, and the mixture is set aside for several hours to permit the solvent to exert a selective solvent action on certain of the impurities present in the product. The mixture may be occasionally stirred during this period. The mixture is then transferred to a filter press or suction filter and the solvent filtered out. The substance in the filter is washed two or three times, using about 100 liters of solvent each time until the original solution has been displaced and the greater part of the soluble impurities removed and a product of the desired purity obtained. By pressure or vacuum filtration the substance is freed from as much as possible of the solvent and then dried at a moderate temperature, around 50° C. The phenolphthalein product so obtained is fluffy and of a yellow or yellowish or cream yellow color, has a velvet-like appearance and is amorphous when viewed under the microscope. Its melting point is 256° C. or higher, its ash content 0.05% or less. It is readily soluble in alkali and in ordinary alcohol. It has the desirable property of being non-dusting, a property which makes it especially valuable for the manufacture of certain laxatives.

The purification of the crude phenolphthalein by dissolving in caustic soda and precipitation with acid gives a partially purified yellow phenolphthalein which corresponds to the yellow phenolphthalein now on the market. The further purification of this partially purified product to increase its purity is effected, according to the present invention, by a selective extraction of impurities with a solvent which does not materially affect the phenolphthalein itself, leaving it in its amorphous state, by removing therefrom a further amount of the impurities so that the resulting yellow phenolphthalein is of relatively high purity, meeting the U. S. P. requirements as to melting point and ash content, while being differentiated from the U. S. P. crystalline or amorphous product by its physical characteristics, its yellow color and its increased activity.

The solvent employed for purifying the yellow phenolphthalein contains the impurities, together with some phenolphthalein. When this solvent is insoluble in water it is extracted with a dilute solution of caustic soda to remove from it phenolphthalein and other impurities soluble in the caustic soda, and the solvent is then separated from the caustic soda solution and can be used over again. The caustic solution used for extracting the phenolphthalein etc. from the solvent can be used for dissolving a new batch of crude phenolphthalein. In case the solvent used for extracting the impurities from the phenolphthalein is soluble in water, it is distilled off from the impurities and the residue taken up with caustic soda to recover the phenolphthalein from it and this caustic soda solution can then be used in the purification of further batches of crude phenolphthalein.

I claim:

1. A yellow amorphous phenolphthalein having an ash content not exceeding 0.05% and a melting point of not less than 256° C.

2. The method of producing an improved amorphous yellow phenolphthalein which comprises extracting partially purified yellow amorphous phenolphthalein with a solvent for impurities but not for phenolphthalein to remove impurities therefrom to such an extent that the resulting yellow phenolphthalein has a melting point of not less than 256° C. and an ash content of not more than 0.05%.

In testimony whereof I affix my signature.

JOSEPH EBERT.